US012313266B2

(12) United States Patent
Lee et al.

(10) Patent No.: US 12,313,266 B2
(45) Date of Patent: May 27, 2025

(54) RANGE HOOD

(71) Applicant: Samsung Electronics Co., Ltd., Suwon-si (KR)

(72) Inventors: Nokhaeng Lee, Suwon-si (KR); Jeawon Lee, Suwon-si (KR); Jeonghoon Kang, Suwon-si (KR); Minsung Kim, Suwon-si (KR); Sung Han, Suwon-si (KR); Kwanwoo Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 17/727,900

(22) Filed: Apr. 25, 2022

(65) Prior Publication Data

US 2022/0381446 A1 Dec. 1, 2022

Related U.S. Application Data

(63) Continuation of application No. PCT/KR2022/003481, filed on Mar. 11, 2022.

(30) Foreign Application Priority Data

May 25, 2021 (KR) ........................ 10-2021-0067131
Jul. 2, 2021 (KR) ........................ 10-2021-0090095

(51) Int. Cl.
*F24C 15/20* (2006.01)
*H04R 1/02* (2006.01)
(Continued)

(52) U.S. Cl.
CPC ............. *F24C 15/20* (2013.01); *H04R 1/028* (2013.01); *H04R 1/403* (2013.01); *H04R 3/12* (2013.01)

(58) Field of Classification Search
CPC ......... F24C 15/20; H04R 1/028; H04R 1/403; H04R 3/12
(Continued)

(56) References Cited

U.S. PATENT DOCUMENTS 8,123,468 B2 2/2012 Shirahama et al.
9,097,222 B2 8/2015 Cho
(Continued)

FOREIGN PATENT DOCUMENTS

CN 208536090 U 2/2019
EP 2196737 A1 6/2010
(Continued)

OTHER PUBLICATIONS

International Search Report dated Jun. 24, 2022 in connection with International Patent Application No. PCT/KR2022/003481, 4 pages.

*Primary Examiner* — Vivek K Shirsat

(57) ABSTRACT

Disclosed herein is a range hood having improved sound characteristics by improving a structure thereof. The range hood includes a case including an inlet through which air is introduced, and a fan module arranged inside the case to suck air through the inlet. The fan module includes a fan configured to move air by rotating, a motor configured to supply a driving force to rotate the fan, a fan frame provided to accommodate the fan and the motor therein, the fan frame including a fan inlet and a fan outlet, and a sound generating member provided to generate a sound of a predetermined frequency band when in contact with the air discharged through the fan outlet.

20 Claims, 15 Drawing Sheets

(51) Int. Cl.
*H04R 1/40* (2006.01)
*H04R 3/12* (2006.01)

(58) Field of Classification Search
USPC .................................... 126/299 R; 454/49–67
See application file for complete search history.

(56) References Cited

U.S. PATENT DOCUMENTS

| | | | | |
|---|---|---|---|---|
| 9,447,979 | B2 | 9/2016 | Corleoni et al. | |
| 10,229,666 | B2 | 3/2019 | Hanazono et al. | |
| 2012/0301329 | A1 | 11/2012 | Bilodeau et al. | |
| 2015/0114384 | A1* | 4/2015 | Bruin-Slot .............. | F24C 15/20 126/299 D |
| 2017/0229111 | A1* | 8/2017 | Hanazono ........ | G10K 11/17853 |

FOREIGN PATENT DOCUMENTS

| | | | |
|---|---|---|---|
| JP | 5135967 | B2 | 2/2013 |
| JP | 2014-006014 | A | 1/2014 |
| JP | 6179062 | B2 | 8/2017 |
| JP | 6384784 | B2 | 9/2018 |
| JP | 2020-148347 | A | 9/2020 |
| KR | 10-2010-0076897 | A | 7/2010 |
| KR | 10-1405222 | B1 | 6/2014 |
| KR | 10-2015-0041235 | A | 4/2015 |
| KR | 10-1623801 | B1 | 5/2016 |
| KR | 10-2017-0053930 | A | 5/2017 |
| KR | 10-1893263 | B1 | 8/2018 |

* cited by examiner

RANGE HOOD

CROSS-REFERENCE TO RELATED APPLICATIONS

This application is a continuation of International Application No. PCT/KR2022/003481 filed on Mar. 11, 2022, which is based on and claims priority under 35 U.S.C. § 119 to Korean Patent Application No. 10-2021-0067131 filed on May 25, 2021, and Korean Patent Application No. 10-2021-0090095 filed on Jul. 2, 2021, in the Korean Intellectual Property Office, the disclosures of which are incorporated by reference herein in their entirety.

BACKGROUND

1. Field

The disclosure relates to a range hood, and more particularly, to a range hood having improved sound characteristics by improving a structure thereof.

2. Description of Related Art

A range hood is a device arranged above a food heater to suck contaminants such as combustion gas, fine dust, and oil mist generated from the food when the food is heated.

Conventionally, the noise reduction technology for reducing the noise generated from the range hood has been limited. Recently, the overall noise generated from the range hood has been reduced due to the development of the silencer technology.

However, as the sound generated from the range hood became smaller, it is rather difficult for the user to feel the performance of the range hood, which lowered user satisfaction.

SUMMARY

Therefore, it is an aspect of the disclosure to provide a range hood capable of allowing a user to feel an enhanced performance by enhancing a sound of a predetermined band.

It is another aspect of the disclosure to provide a range hood capable of improving sound characteristics by improving a structure thereof.

Additional aspects of the disclosure will be set forth in part in the description which follows and, in part, will be obvious from the description, or may be learned by practice of the disclosure.

In accordance with an aspect of the disclosure, a range hood including a case including an inlet through which air is introduced, and a fan module arranged inside the case to suck air through the inlet. The fan module includes a fan configured to move air by rotating, a motor configured to supply a driving force to rotate the fan, a fan frame provided to accommodate the fan and the motor therein, the fan frame including a fan inlet and a fan outlet, and a sound generating member provided to generate a sound of a predetermined frequency band when in contact with the air discharged through the fan outlet.

The predetermined frequency band may be a frequency band of 1 kHz or less.

The sound generating member may be arranged in the fan frame to cross the fan outlet.

The sound generating member may be removably coupled to the fan frame.

The sound generating member may include a first sound generating member, and a second sound generating member spaced apart from the first sound generating member and arranged in parallel with the first sound generating member.

A diameter of the first sound generating member is different from a diameter of the second sound generating member.

Based on the first sound generating member and the second sound generating member respectively extending in a first direction, a rotation axis of the fan may extend in a second direction intersecting the first direction, and the first sound generating member may be spaced apart from the second sound generating member in a third direction intersecting the first direction and the second direction.

The range hood may further include a connecting member including a first opening having a diameter corresponding to a diameter of the fan outlet, and a second opening connected to the first opening and having a diameter different from the first opening.

The connecting member may be coupled to the fan frame to allow the first opening to be connected to the fan outlet.

The sound generating member may be provided to cross an inside of the connecting member so as to be in contact with the air that is discharged from the fan outlet through the second opening.

The fan module may be arranged inside the case in such a way that the rotation axis of the fan extends in a front and rear direction.

The case may include a first case in which the inlet is provided on a lower surface thereof, and a second case provided above the first case and provided to accommodate the fan module.

The second case may include an opening formed on an upper surface thereof.

At least a portion of the fan frame including the fan outlet may be provided to be inserted into the opening.

The sound generating member may include a section in which a cross-sectional area changes along a direction in which the sound generating member extends.

Across section of the sound generating member may be a circular shape, an airfoil shape, or a polygonal shape.

In accordance with another aspect of the disclosure, a range hood including a case including an inlet formed on a lower surface thereof and an outlet formed above the inlet, and a fan module arranged inside the case to suck air through the inlet and provided to discharge the air through the outlet. The fan module includes a fan configured to move air, a motor configured to rotate the fan, and a sound generating member arranged to cross the outlet and provided to generate a sound of 1 kHz or less when in contact with the air discharged through the outlet.

The sound generating member may include a first sound generating member, and a second sound generating member spaced apart from the first sound generating member and arranged in parallel with the first sound generating member.

A diameter of the first sound generating member may be different from a diameter of the second sound generating member.

Based on the first sound generating member and the second sound generating member respectively extending in a first direction, a rotation axis of the fan may extend in a second direction intersecting the first direction, and the first sound generating member may be spaced apart from the second sound generating member in a third direction intersecting the first direction and the second direction.

The sound generating member may include a section in which a cross-sectional area changes along a direction in which the sound generating member extends.

Across section of the sound generating member may be a circular shape, an airfoil shape, or a polygonal shape.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 is a graph illustrating a comparison of sound characteristics of a target sound of the range hood for each frequency band, and sound characteristics of the range hood without a sound generating member, for each frequency band;

DETAILED DESCRIPTION

Figure 1:
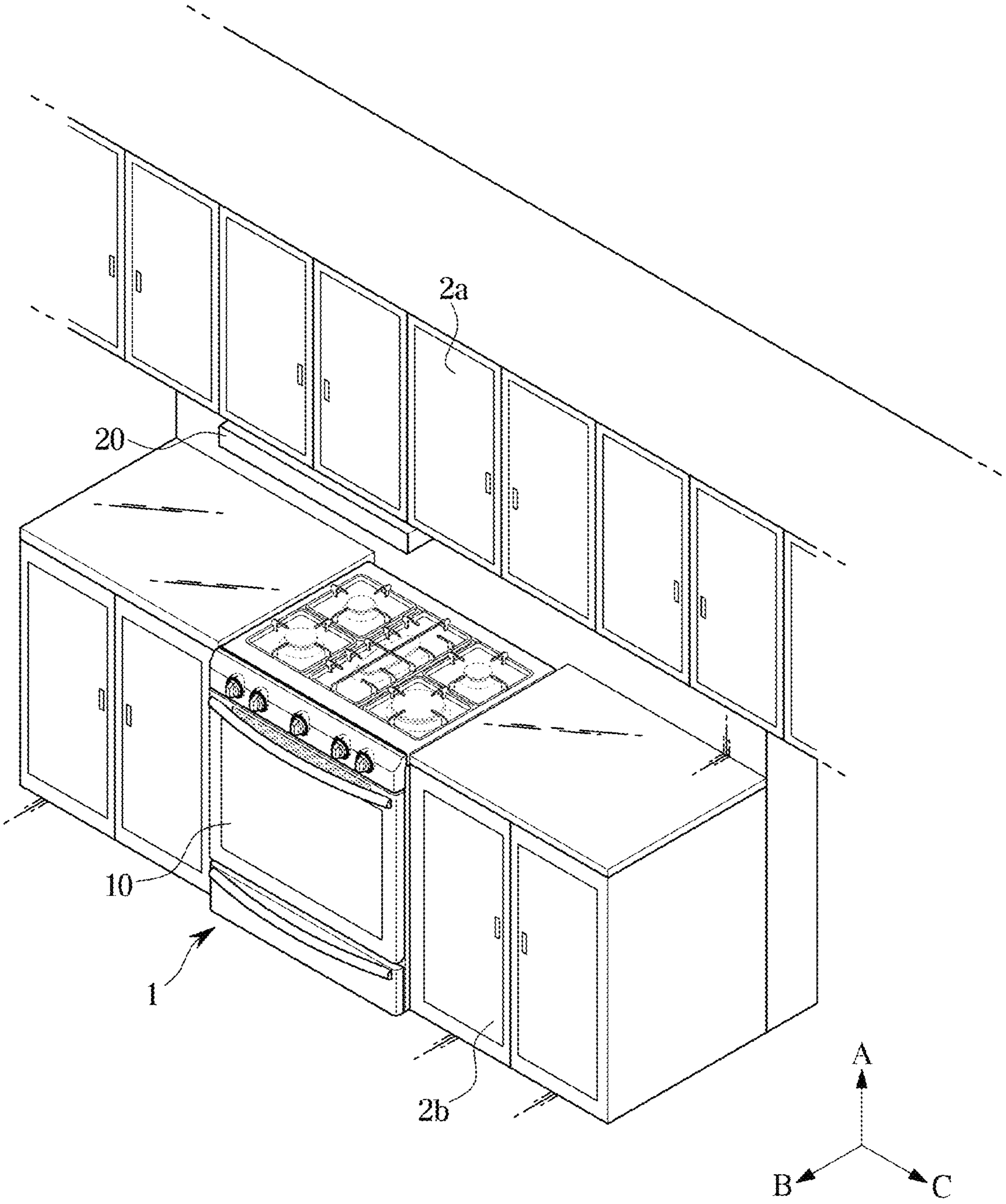
FIG. 1 is a perspective view illustrating a state in which a cooking appliance is installed according to various embodiments of the disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms “a,” “an” and “the” are intended to include the plural forms as well, unless the context clearly indicates otherwise. In this disclosure, the terms “including”, “having”, and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front side", "rear side", "left side", "right side" and the like may be defined by the drawings, but the shape and the location of the component is not limited by the term.

Hereinafter certain embodiments according to the disclosure will be described in detail with reference to the accompanying drawings.

Figure 7:
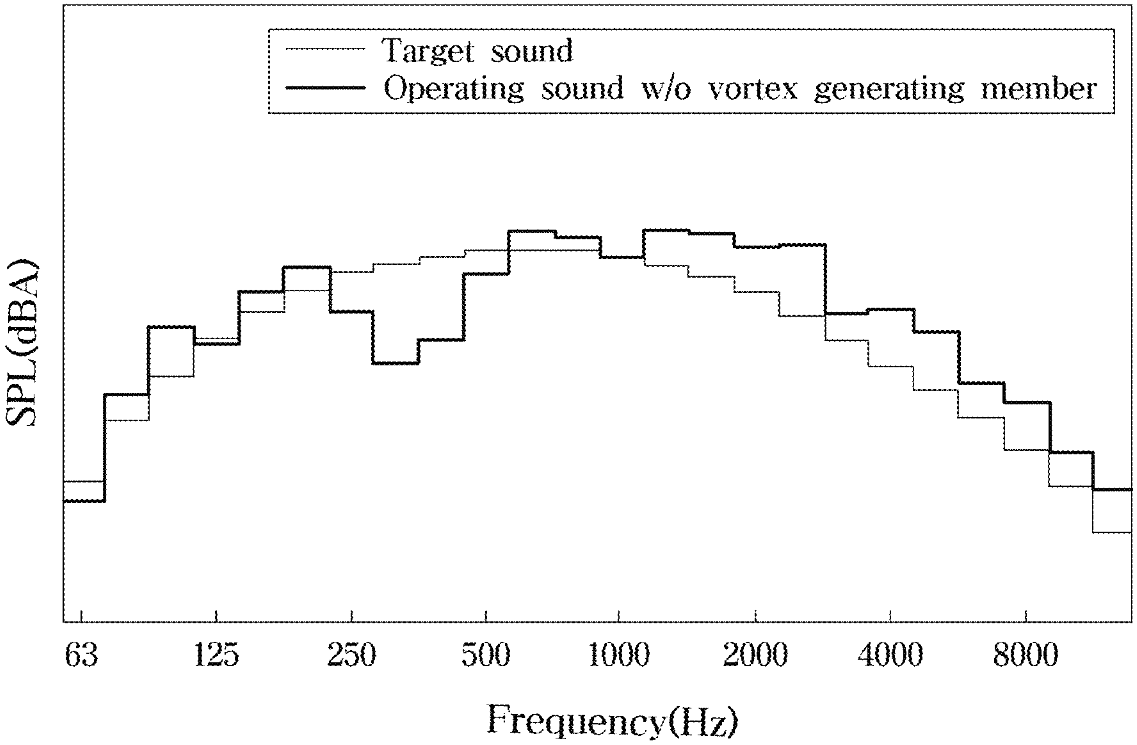
FIG. 7 is a graph illustrating a comparison of sound characteristics for each frequency band, of a target sound of the range hood and sound characteristics for each frequency band of the range hood without a sound generating member.
Figure 8:
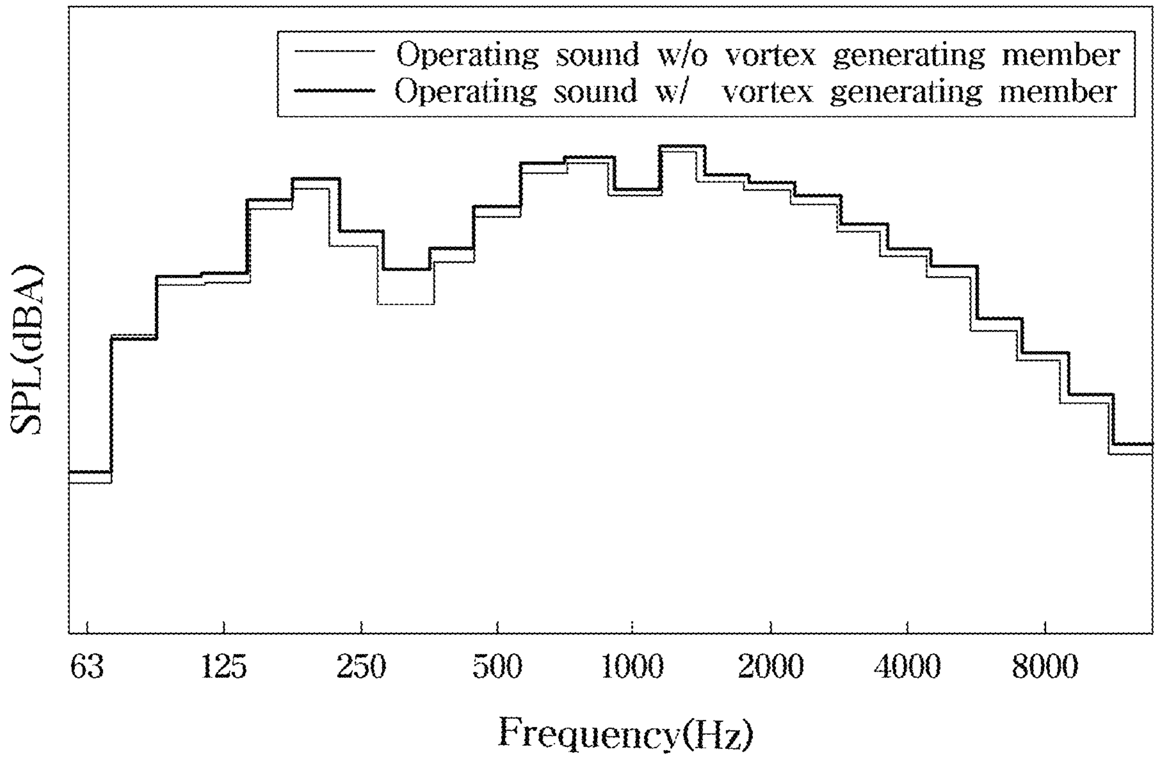
FIG. 8 is a graph illustrating a comparison of sound characteristics of the range hood with the sound generating member illustrated in FIG. 5, for each frequency band, and sound characteristics of the range hood without the sound generating member, for each frequency band.
Figure 13:
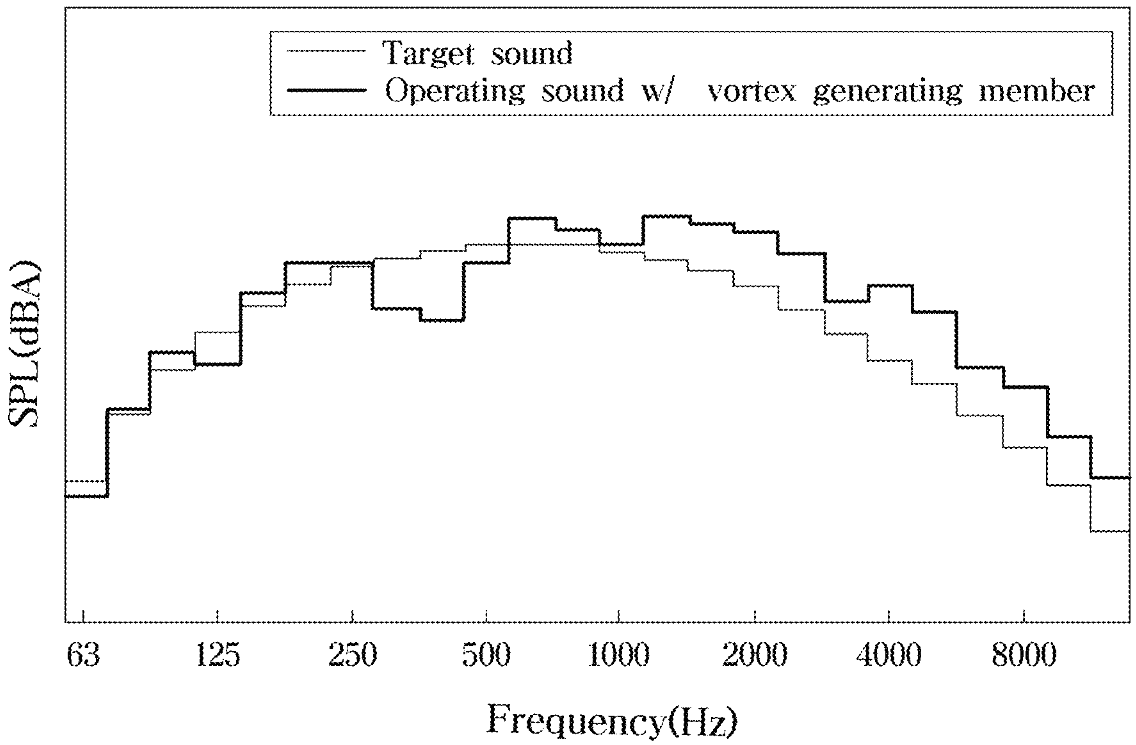
FIG. 13 is a graph illustrating a comparison of sound characteristics of a target sound of the range hood with a sound generating member, for each frequency band, and sound characteristics of the range hood for each frequency band.

A vortex generating member described in FIGS. 7, 8 and 13 may refer to a sound generating member.

Figure 2:
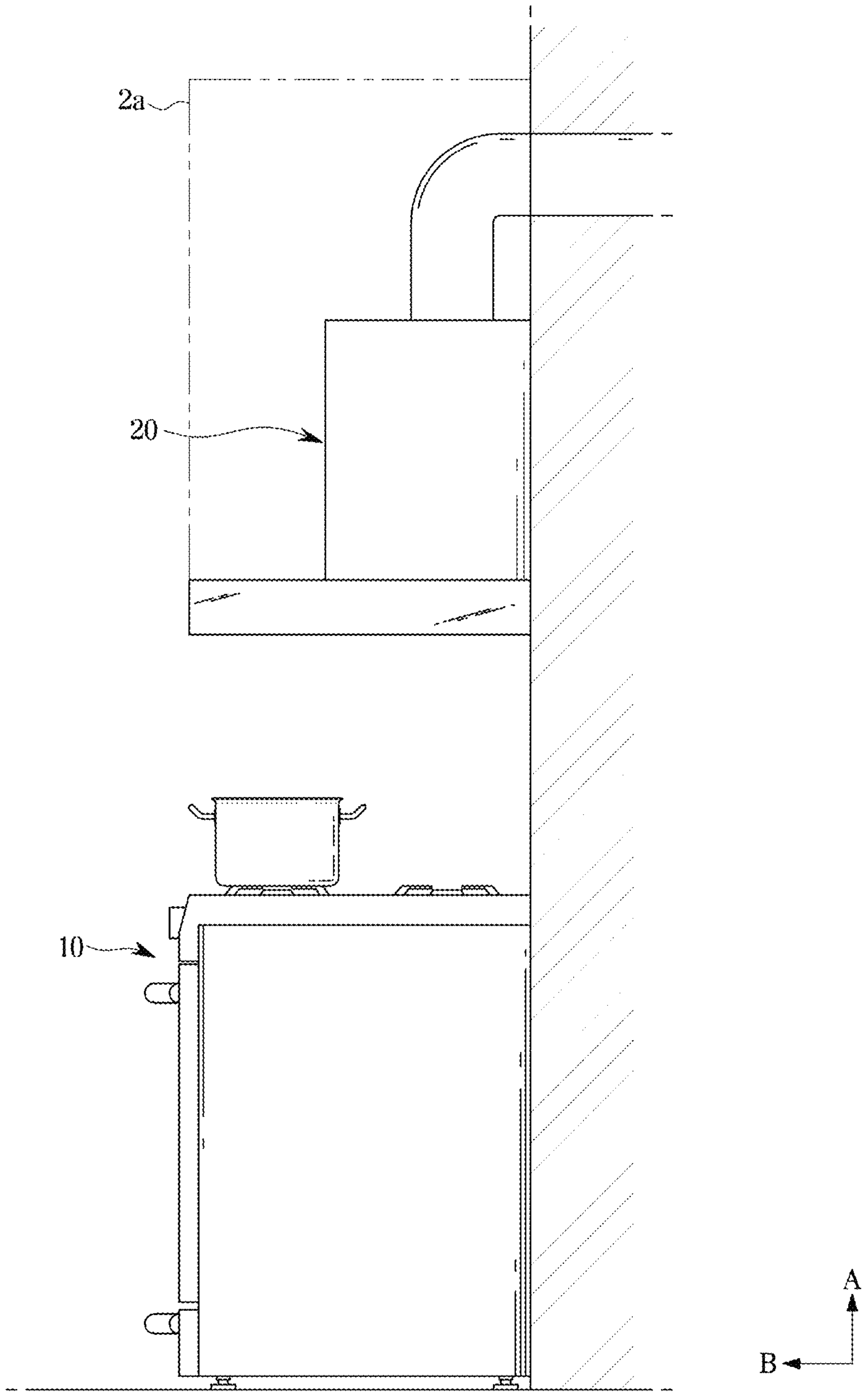
FIG. 2 is a side view illustrating the state in which the cooking appliance is installed according to various embodiments of the disclosure.

FIG. 1 is a perspective view illustrating a state in which a cooking appliance is installed according to various embodiments of the disclosure. FIG. 2 is a side view illustrating the state in which the cooking appliance is installed according to various embodiments of the disclosure.

Referring to FIGS. 1 and 2, a cooking appliance 1 may be arranged indoors according to various embodiments of the disclosure. For example, the cooking appliance 1 may be arranged in a kitchen. The cooking appliance 1 may be coupled to cabinets 2*a* and 2*b*.

The cooking appliance 1 may include a heater 10 configured to heat food. The heater 10 may be provided as an oven, a gas range, induction, or the like. Particularly, the heater 10 may include a cooktop unit and a user may put food material on the heater 10 so as to cook the food.

The cooking appliance 1 may include a range hood 20. The range hood 20 may suck exhaust gas, smoke, or food odor generated by the heater 10 and discharge the sucked air to the outside.

In certain embodiments of the disclosure, the range hood 20 is defined as a configuration of the cooking appliance 1, but the disclosure is not limited thereto, and the range hood 20 may be defined as a configuration independent of the cooking appliance 1.

The range hood 20 is not limited to an embodiment of the disclosure and may be provided to be coupled to a cooking appliance unit such as an over the range (OTR).

The range hood 20 may be arranged in an upper cabinet 2*a*. The heater 10 of the cooking appliance 1 may be spaced apart from the range hood 20 by a predetermined distance in a first direction A and installed under the range hood 20. The heater 10 may be arranged in a lower cabinet 2*b*. Hereinafter the first direction A indicates an up and down direction.

That is, the range hood 20 may be arranged on the heater 10 in the first direction A. Accordingly, exhaust gas, smoke, or food odor generated from the heater 10 may be sucked upward and discharged to the outside.

Although an example in which the cooking appliance 1 is installed indoors has been described, an installation method of the cooking appliance 1 is not limited thereto. Therefore, the cooking appliance 1 may be installed in various ways depending on a size or characteristics of a place where the cooking appliance 1 is installed, the purpose of installation, and the like.

Hereinafter the range hood 20 will be described in more detail.

Figure 3:
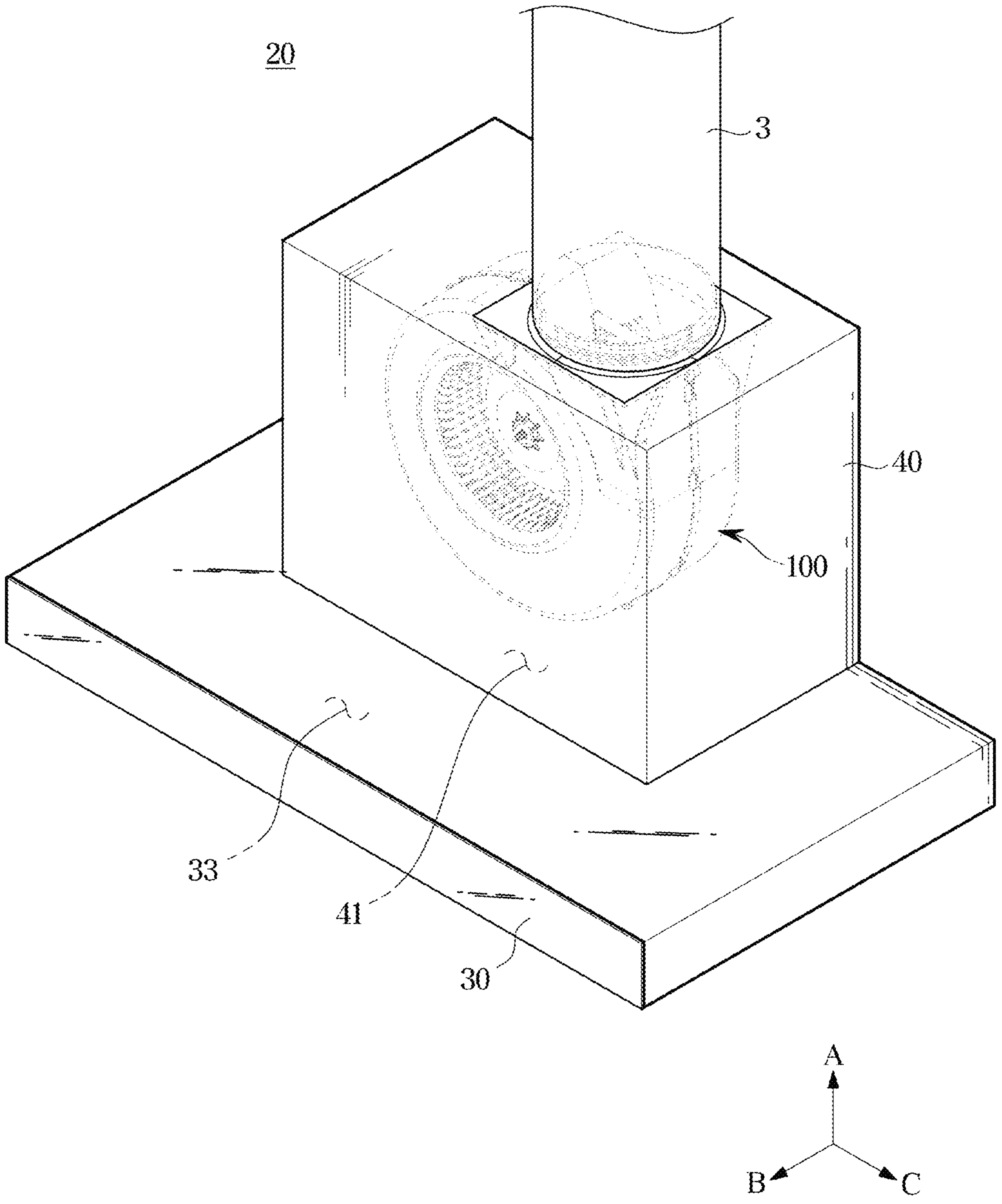
FIG. 3 is a perspective view illustrating a range hood according to various embodiments of the disclosure.
Figure 4:
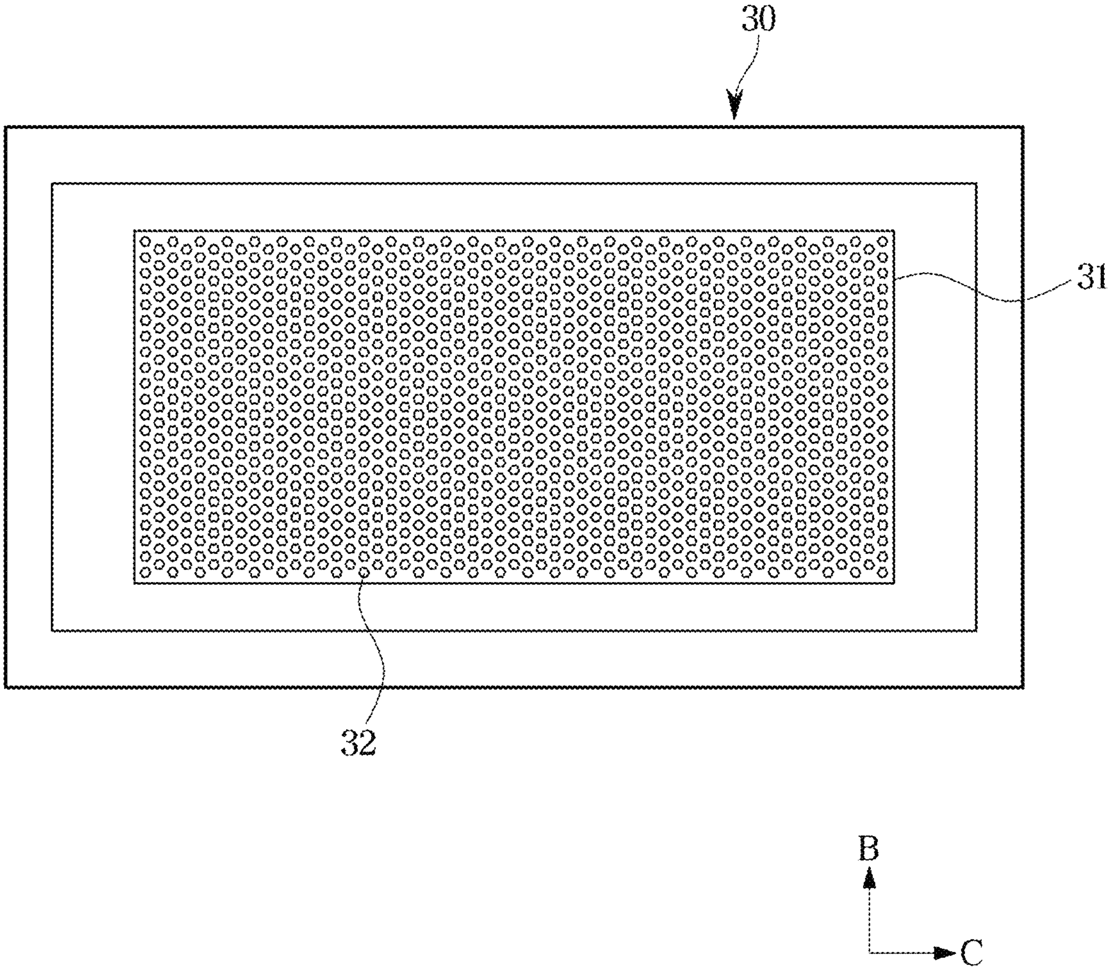
FIG. 4 is a bottom view illustrating the range hood according to various embodiments of the disclosure.

FIG. 3 is a perspective view illustrating a range hood according to various embodiments of the disclosure. FIG. 4 is a bottom view illustrating the range hood according to various embodiments of the disclosure.

Referring to FIGS. 3 and 4, the range hood 20 according to various embodiments of the disclosure may include a first case 30, a second case 40, and a fan module 100.

The first case 30 may include an inlet 31 through which smoke generated by the heater 10 is introduced. The inlet 31 may be provided on a lower surface of the first case 30. A filter 32 corresponding to the inlet 31 may be mounted to the inlet 31. The filter 32 may be mounted on the first case 30 to cover the inlet 31. The filter 32 may be provided to filter out foreign substances contained in smoke, etc. introduced into the inlet 31.

The first case 30 may be provided in a substantially rectangular parallelepiped shape. A flow path 33 may be formed inside the first case 30. The flow path 33 may be provided to guide air, which passes through the filter 32 and the inlet 31, to the second case 40. The flow path 33 may refer to a space inside the first case 30, or alternatively, to a space partitioned inside the first case 30 or a duct installed inside the first case 30.

The second case 40 may be arranged above the first case 30. The fan module 100 may be arranged inside the second case 40. The second case 40 may be provided in a substantially rectangular parallelepiped shape like the first case 30. The second case 40 may be formed in such a way that an area of a lower surface and an upper surface of the second case 40 is less than that of the first case 30 and a height of the second case 40 is greater than that of the first case 30. The second case 40 may be provided separately from the first case 30 and coupled to the first case 30. Alternatively, the second case 40 may be integrally formed with the first case 30. Alternatively, the second case 40 may be formed integrally with the first case 30 in such a way that an upper surface of the first case 30 extends upward to be inclined with respect to the first direction A.

A flow path 41 may be formed inside the second case 40. The flow path 41 may be connected to the flow path 33 of the first case 30. The air introduced through the inlet 31 may pass through the flow path 33 of the first case 30 and the flow path 41 of the second case 40 and then be discharged to the outside through an exhaust pipe 3. The fan module 100 may be provided in the flow path 41. The flow path 41 may refer to a space inside the second case 40, or alternatively, to a space partitioned inside the second case 40 or a duct installed inside the second case 40.

According to certain embodiments of the disclosure, the fan module 100 may be arranged inside the second case 40. Further, the fan module 100 may be arranged in such a way that a rotation axis of a fan 110, which will be described later, extends in a second direction B. Hereinafter, the second direction refers to a front and rear direction. That is, the fan module 100 may be arranged in such a way that the rotation axis of the fan 110 extends in the front and rear direction. Due to the arrangement of the fan module 100, air may be sucked from a front side of the fan module 100 and discharged upward. The fan module 100 may be connected to the exhaust pipe 3 so as to discharge the air to the outside.

Figure 5:
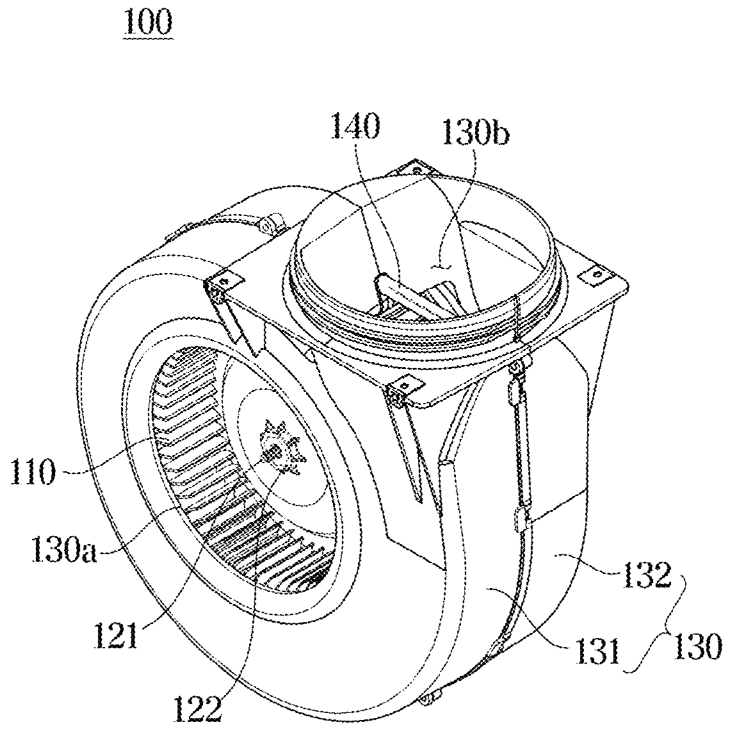
FIG. 5 is a view illustrating a fan module separated from the range hood according to various embodiments of the disclosure.
Figure 6:
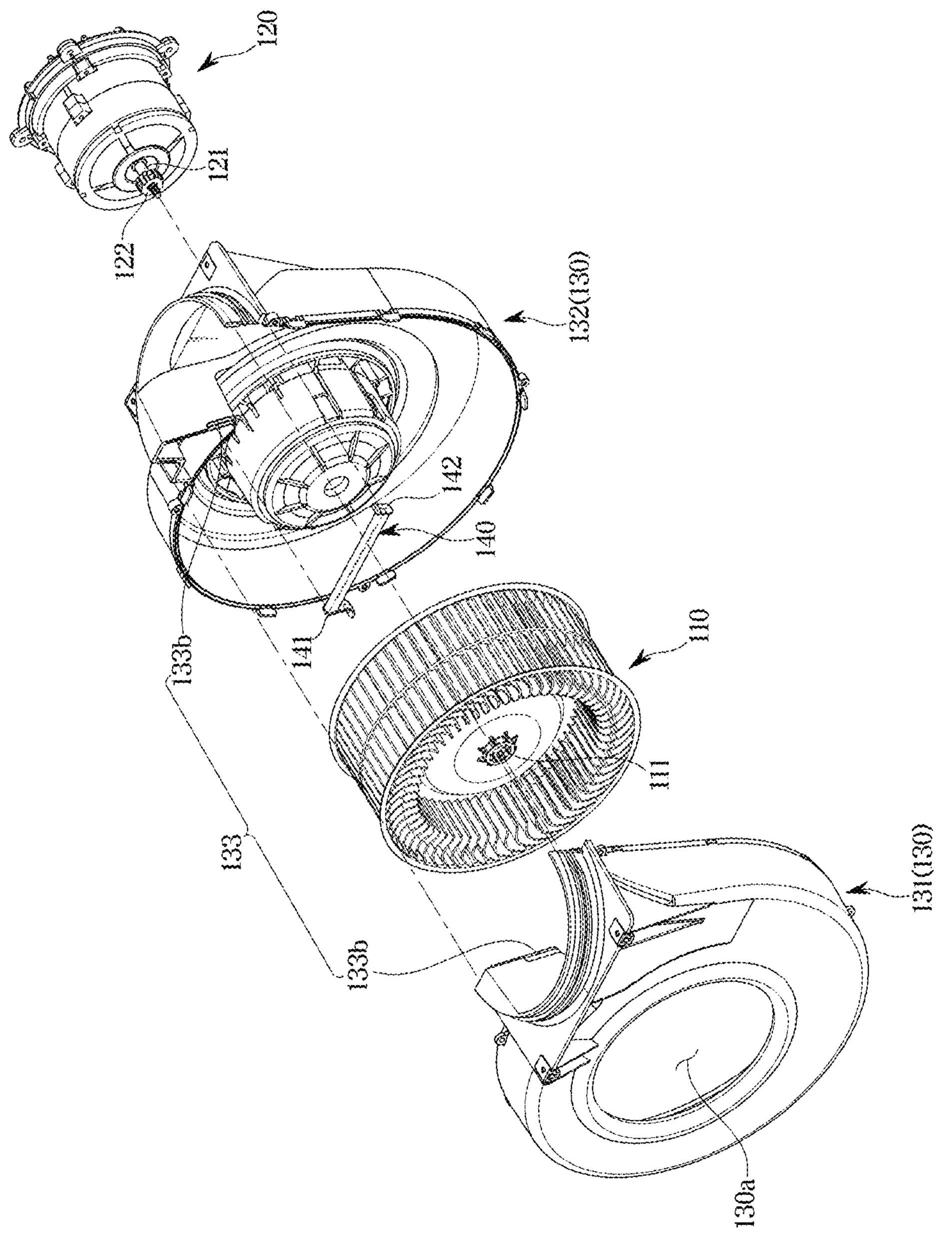
FIG. 6 is an exploded view illustrating the fan module illustrated in FIG. 5.

FIG. 5 is a view illustrating a fan module separated from the range hood according to various embodiments of the disclosure. FIG. 6 is an exploded view illustrating the fan module illustrated in FIG. 5.

Hereinafter, the configuration of the fan module of the range hood according to various embodiments of the disclosure will be described in detail with reference to FIGS. 5 and 6.

According to certain embodiments of the disclosure, the fan module 100 may include the fan 110 configured to move air by rotating, a motor 120 configured to rotate the fan, a fan frame 130 provided to accommodate the fan 110 and the motor 120 therein, and a sound generating member 140 coupled to the fan frame 130.

The fan 110 may be configured to move air by rotating. According to certain embodiments of the disclosure, the fan 110 may include a centrifugal fan. The centrifugal fan may suck air in a direction parallel to the rotation axis and then radially discharge the sucked air. According to certain embodiments of the disclosure, the rotation axis of the fan 110 may be arranged inside the second case 40 to extend in the front and rear direction. The fan 110 may include a gear hole 111 provided in a center thereof.

The motor 120 may supply a driving force to rotate the fan 110. The motor 120 may include a rotation shaft 121 and a relative rotation prevention gear 122 coupled to the rotation shaft 121 to rotate together with the rotation shaft 121.

The relative rotation prevention gear 122 may be inserted into a gear hole 111 provided in the center of the fan 110. The gear hole 111 may be provided in a shape corresponding to the relative rotation prevention gear 122. Because the relative rotation prevention gear 122 and the gear hole 111 are provided in corresponding shapes, the relative rotation prevention gear 122 inserted into the gear hole 111 may not relatively rotate in the gear hole 111. The relative rotation prevention gear 122 may rotate together with the rotation shaft 121, and the relative rotation prevention gear 122 may be inserted into the gear hole 111 to rotate together with the fan 110. Accordingly, in response to the rotation of the rotation shaft 121 by the motor 120, the fan 110 may rotate.

The fan frame 130 may be provided to accommodate the fan 110 and the motor 120 therein. The fan frame 130 may include a first fan frame 131 covering one side of the fan 110 and a second fan frame 132 covering the other side of the fan 110. The first fan frame 131 may be coupled to the second fan frame 132 by moving in the direction of the rotation axis of the fan 110. The first fan frame 131 may be coupled to the second fan frame 132 to form a space therein, and the fan 110 and the motor 120 may be installed in the space formed by the first fan frame 131 and the second fan frame 132. In addition, an inner space may serve as a flow path through which air flowing by the fan 110 moves. That is, the fan frame 130 may form a flow path through which air moves.

The fan frame 130 may include a fan inlet **130*a* through which air is introduced and a fan outlet 130*b* through which air is discharged. Air flowing by the rotation of the fan 110 may be introduced into the fan frame 130 through the fan inlet 130*a*, pass through the inside of the fan frame 130 and then be discharged to the outside of the fan frame 130 through the fan outlet 130*b***.

The fan inlet **130*a* may be provided in the first fan frame 131. The fan outlet 130*b* may be formed by coupling the first fan frame 131 to the second fan frame 132. That is, a portion of the fan outlet 130*b* may be formed by the first fan frame 131, and the remaining portion of the fan outlet 130*b* may be formed by the second fan frame 132**.

According to certain embodiments of the disclosure, the fan 110 may be provided as a centrifugal fan, the fan inlet **130*a* may be arranged to face the front of the range hood 20, and the fan outlet 130*b* may be arranged to face an upper side of the range hood 20. The rotation axis of the fan 110 may be arranged parallel to the front and rear direction of the range hood 20**.

According to the disclosure, the fan module 100 may include the sound generating member 140 provided to be in contact with the air flowing by the fan 110 to generate a vortex so as to enhance a sound of a predetermined band. The sound generating member 140 may be provided in a substantially cylindrical shape, but a cross-sectional shape thereof may be provided in various shapes, for example, as a circle. The sound generating member 140 may interchangeable with terms such as a pole, a bar, a shaft, a stick, and a pipe.

According to certain embodiments of the disclosure, the sound generating member 140 may be arranged to cross the fan outlet **130*b* of the fan frame 130. As illustrated in FIG. 6, the sound generating member 140 may be detachably mounted to the fan frame 130. However, the disclosure is not limited thereto, and the sound generating member 140 may be formed integrally with the fan frame 130**.

According to certain embodiments of the disclosure, the sound generating member 140 may include a first coupler 141 and a second coupler 142 provided at both ends thereof, respectively. The first coupler 141 and the second coupler 142 may be respectively inserted into and coupled to a first coupling groove 133 and a second coupling groove provided in the fan frame 130.

According to certain embodiments of the disclosure, the sound generating member 140 may be coupled to the fan frame 130 as the first coupler 141 and the second coupler 142 are inserted into the first coupling groove 133 and the second coupling groove. Further, the sound generating member 140 may be separated from the fan frame 130 in response to the first coupler 141 and the second coupler 142 respectively withdrawing from the first coupling groove 133 and the second coupling groove. That is, the sound generating member 140 may be removably coupled to the fan frame 130.

The first coupling groove 133 may be formed by connecting a first groove **133*a* of the first fan frame 131 to a second groove 133*b* of the second fan frame 132. The first coupling groove 133 may be formed by coupling the first fan frame 131 to the second fan frame 132**.

The second coupling groove may be formed by connecting a third groove of the first fan frame 131 to a fourth groove of the second fan frame 132. The second coupling groove may be formed by coupling the first fan frame 131 to the second fan frame 132.

According to certain embodiments of the disclosure, air flowing by the rotation of the fan 110 may be introduced through the fan inlet **130*a* and pass through the fan frame 130 and then be discharged to the fan outlet 130*b*. The fan outlet 130*b* may be connected to the exhaust pipe 3, and the air discharged to the outside of the fan module 100 through the fan outlet 130*b* may move along the exhaust pipe 3** and then discharged to the outside.

The sound generating member 140 may be arranged to extend across the fan outlet **130*b*. The sound generating member 140 may be arranged to extend in a third direction C. Hereinafter the third direction C indicates a left and right direction. The sound generating member 140 may be arranged to extend in a direction intersecting the rotation axis of the fan 110**.

In response to arranging the sound generating member 140 to cross the fan outlet 130*b*, the air discharged through the fan outlet 130*b* may come into contact with the sound generating member 140. In response to the air, which is discharged through the fan outlet 130*b*, coming into contact with the sound generating member 140, a vortex may be generated, and thus, the sound of a predetermined band may be greater than a state in which the sound generating member 140 is not provided. That is, by providing the sound generating member 140, the sound characteristics of the range hood 20 may be changed. A change in sound characteristics due to the sound generating member 140 will be described later.

As described above, the sound generating member 140 may be arranged on the fan outlet 130*b*. In other words, the sound generating member 140 may be arranged downstream of the flow path formed by the range hood 20. The reason why the sound generating member 140 is positioned at the fan outlet 130*b* is that an air flow velocity is the fastest at the fan outlet 130*b*. The sound generating member 140 is a component provided to be in contact with air to generate a vortex so as to increase a sound level of a desired band. In a condition in which the air flow velocity is too slow even when the air comes into contact with the sound generating member 140, no vortex is generated and the sound level of the desired band does not increase. Accordingly, the sound generating member 140 may be provided at or around the fan outlet 130*b* having a high air flow velocity.

FIG. 7 is a graph illustrating a comparison of sound characteristics of a target sound of the range hood for each frequency band, and sound characteristics of the range hood without a sound generating member, for each frequency band.

Hereinafter the target sound of the range hood illustrated in FIG. 7 will be described in detail.

In the present description, the target sound of the range hood refers to an operating sound of the range hood to be obtained through the disclosure.

It is possible to prepare a plurality of sound sources having different band powers for each frequency band and set a target sound based on the results of a survey for users aged 25 to 59 years.

A plurality of sound sources having different band powers for each frequency band is prepared and a survey is conducted for users aged 25 to 59 years. Accordingly, it is possible to set a target sound based on the results of the survey. As a result of the survey, the user perceived performance of the range hood is changed due to the difference in sound level in a specific frequency band. According to the disclosure, in order to improve the user's perceived performance of the range hood, it is possible to enhance the sound level of the specific frequency band.

Particularly, a sound that allows a user to feel a strong suction force will be described.

The sound of the range hood may be defined acoustically in three main parts. The main parts include a low-frequency sound of 1 kHz or less that is determined by the shape and volume characteristics of the structure containing the fluid, high- and medium-frequency sounds corresponding to flow induced sounds generated by the flow of the fluid, and a peak sound having a tonal component that is generated by the characteristics of the fan and the motor.

Various studies and user surveys show that sound gives a feeling of strong suction of the range hood to a user at a low frequency band with a relatively higher frequency balance than the sound of the high frequency band.

Accordingly, the disclosure is to enhance the user satisfaction with the sound generated from the range hood by strengthening the sound of the low frequency band of 1 kHz or less among the sounds generated from the range hood. In other words, a sound is provided to make the user feel a strong suction power when the user hears the sound generated by the range hood.

Referring to FIG. 7, in the conventional range hood, in which the sound generating member is not provided, the sound level of the low frequency band of 1 kHz or less is low compared to the target sound. Particularly, t the sound level of the band of 200 Hz to 500 Hz of the conventional range hood is lower than the sound level of the same band of the target sound.

FIG. 8 is a graph illustrating a comparison of sound characteristics of the range hood with the sound generating member illustrated in FIG. 5, for each frequency band, and sound characteristics of the range hood without the sound generating member, for each frequency band.

According to the disclosure, it is possible to enhance the sound level in band of 1 kHz or less to allow the user to feel the powerful suction while maintaining the overall level of the sound generated from the range hood at a low level. Accordingly, the user satisfaction with the range hood may be increased.

Referring to FIG. 8, when the range hood 20 includes the sound generating member 140, the sound level of the low frequency band of 1 kHz or less increases. Particularly, the sound level of the band of 200 Hz to 500 Hz increases.

As described above, in response to the increase of the sound level of the low frequency band of 1 kHz or less among the operating sounds of the range hood 20, the user may generally feel that the performance of the range hood 20 is improved. In addition, even if the sound generating member 140 is provided, the overall level of the operating sound of the range hood 20 may be maintained. Accordingly, it is possible to prevent consumer dissatisfaction due to an increase in noise of the range hood 20.

Hereinafter a method of determining a diameter of the sound generating member 140 will be described. In response to a change in the diameter of the sound generating member 140, the frequency band, in which the sound level is increased, may also be changed. Therefore, in order to increase the sound level of a desired frequency band, the diameter of the sound generating member 140 is required to be appropriately set. However, if the diameter thereof is determined based on experiments, it may take too much time and money. To prevent this, after deriving an appropriate diameter of the sound generating member 140 through the following process, an appropriate diameter of the sound generating member 140 may be determined through additional experiments.

As described above, the sound generating member 140 may be installed in the flow path of the range hood 20. Particularly, in the flow path of the range hood 20, the sound generating member 140 may be installed on the downstream side of the flow path having the high air flow velocity. According to certain embodiments of the disclosure, the sound generating member 140 may be installed in the fan frame 130 to cross the fan outlet 130*b* of the fan frame 130. Accordingly, in response to the installation of the sound generating member 140, the air passing through the flow path comes into contact with the sound generating member 140 to generate a vortex of a certain period. This is called vortex shedding, and a frequency f of the vibration is to be defined as a function of the diameter D of the sound generating member 140 and a velocity V of fluid in contact with the sound generating member 140. The frequency f may be calculated by the following equation from a function of the Strouhal number St, the diameter D of the sound generating member 140, and the fluid velocity V.

$$f=(St*V)/D$$

The Strouhal number St is a dimensionless number that varies depending on the Reynolds number Re, and the Strouhal number St has a value of about 0.2 when the Reynolds number Re has a value between 250 and 200,000. This can be expressed by the following equation.

$$St=0.198(1-19.7/Re)$$

The Reynolds number Reis the ratio of the force due to inertia to the force due to viscosity. It is a dimensionless number used to predict the flow of fluid, and it may be expressed by the following equation together with the dynamic viscosity coefficient v.

$$Re=(V*D)/v$$

By summarizing the above equations, the frequency f of vortex shedding may be defined by the following equation.

$$f=0.198(V-19.7*v/D)/D$$

In conclusion, it is possible to generate a sound of a desired frequency f by identifying an average flow velocity V and a dynamic viscosity coefficient v of the ambient air, in which the sound generating member 140 provided in the cylindrical shape is located, and by designing an appropriate diameter D of the sound generating member 140 according to the above equation.

A cross-sectional shape of the sound generating member 140 may be provided in a circular shape, an airfoil shape, or a polygonal shape. In addition, the sound generating member 140 may be provided in such a way that the cross-sectional area changes along the direction in which the sound generating member 140 extends.

Figure 9:
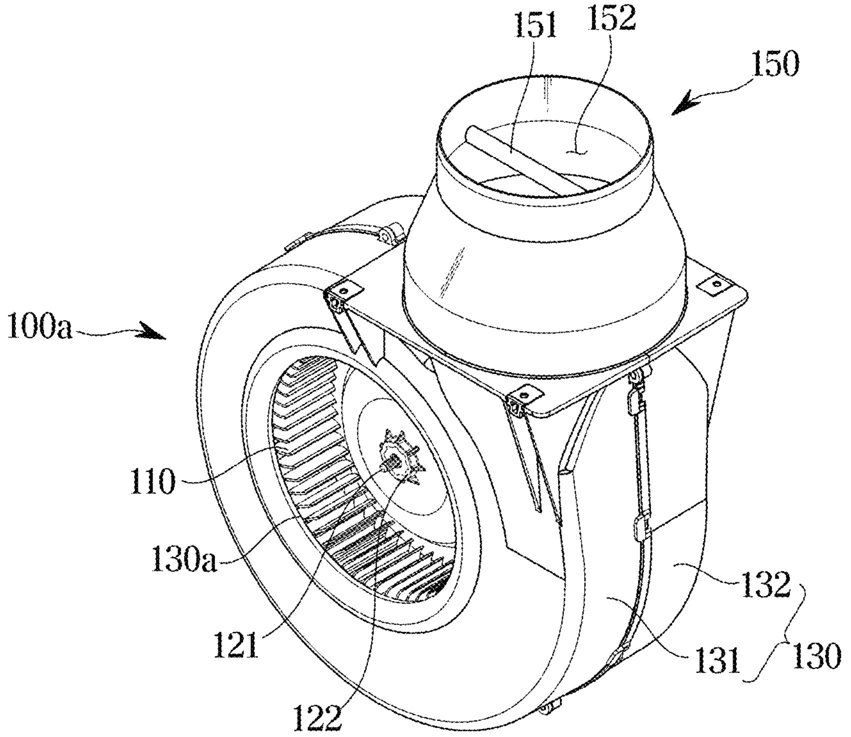
FIG. 9 is a view illustrating a fan module and a connecting member separated from a range hood according to various embodiments of the disclosure.
Figure 10:
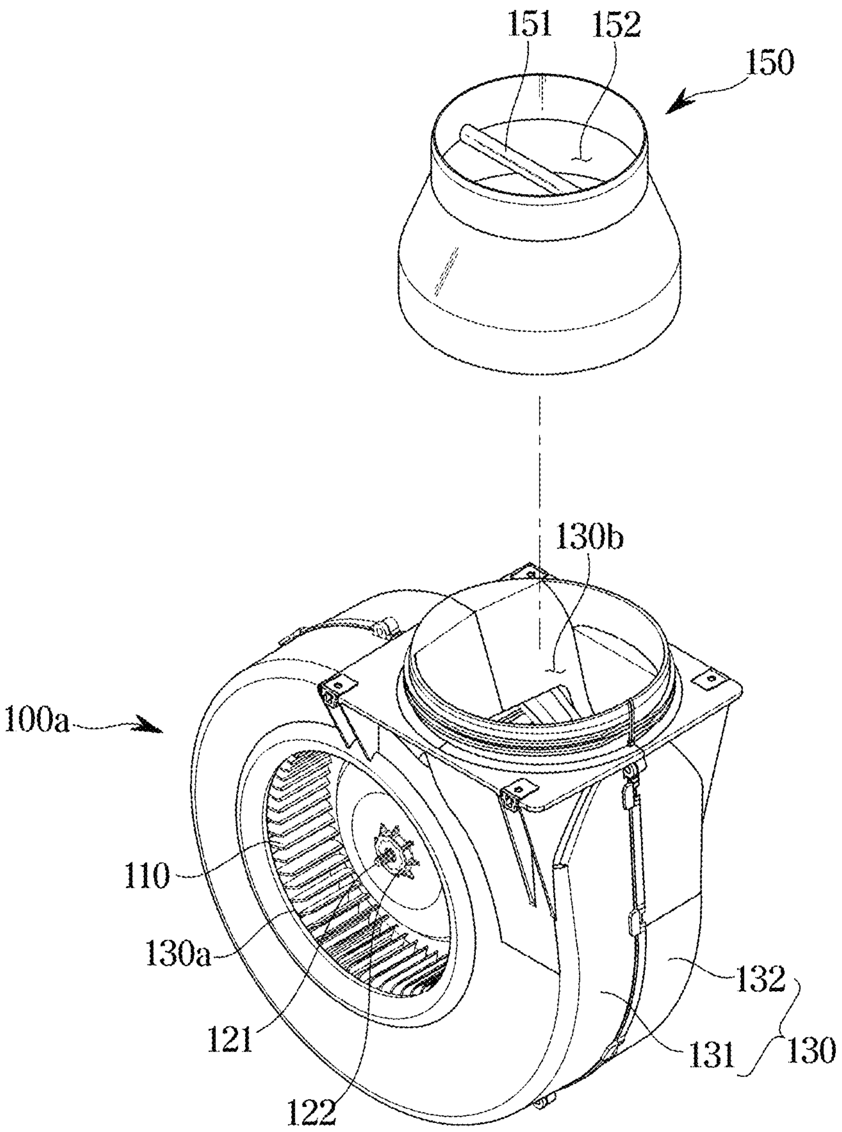
FIG. 10 is a view illustrating the fan module separated from the connecting member separated illustrated in FIG. 9.

FIG. 9 is a view illustrating a fan module and a connecting member separated from a range hood according to various embodiments of the disclosure. FIG. 10 is a view illustrating the fan module separated from the connecting member separated, illustrated in FIG. 9.

A fan module 100*a* of a range hood according to various embodiments of the disclosure will be described with reference to FIGS. 9 and 10.

Referring to FIGS. 9 and 10, the fan module 100*a* of the range hood according to various embodiments of the disclosure may include a connecting member 150 connecting the fan outlet 130*b* to the exhaust pipe 3 (refer to FIG. 3). The connecting member 150 may be removably coupled to a protrusion of the fan frame 130 forming the fan outlet 130*b*. The connecting member 150 may connect the exhaust pipe 3 to the fan frame 130 in a state in which the exhaust pipe 3 is not allowed to be directly coupled to the fan frame 130 because an inner diameter of the exhaust pipe 3 is different from a diameter of the fan outlet 130*b*. Accordingly, the connecting member 150 may include a first opening corresponding to the diameter of the fan outlet 130*b* and a second opening 152 corresponding to the diameter of the exhaust pipe 3.

According to certain embodiments of the disclosure, a sound generating member 151 may be arranged on the connecting member 150. The sound generating member 151 may be provided integrally with the connecting member 150 or may be removably coupled to the connecting member 150 like the sound generating member 140 illustrated in FIGS. 5 and 6.

As illustrated in FIGS. 9 and 10, the sound generating member 151 may be provided to cross a second opening 152 of the connecting member 150. However, the disclosure is not limited thereto. The sound generating member 151 may be provided to cross the first opening of the connecting member 150 or may be provided between the first opening and the second opening.

Figure 11:
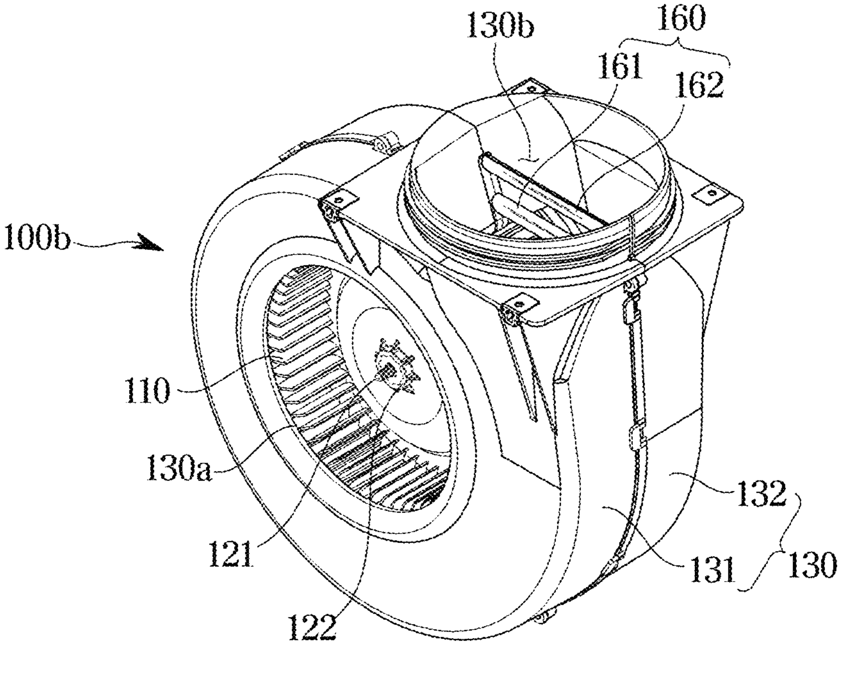
FIG. 11 is a view illustrating a fan module separated from a range hood according to various embodiments of the disclosure.
Figure 12:
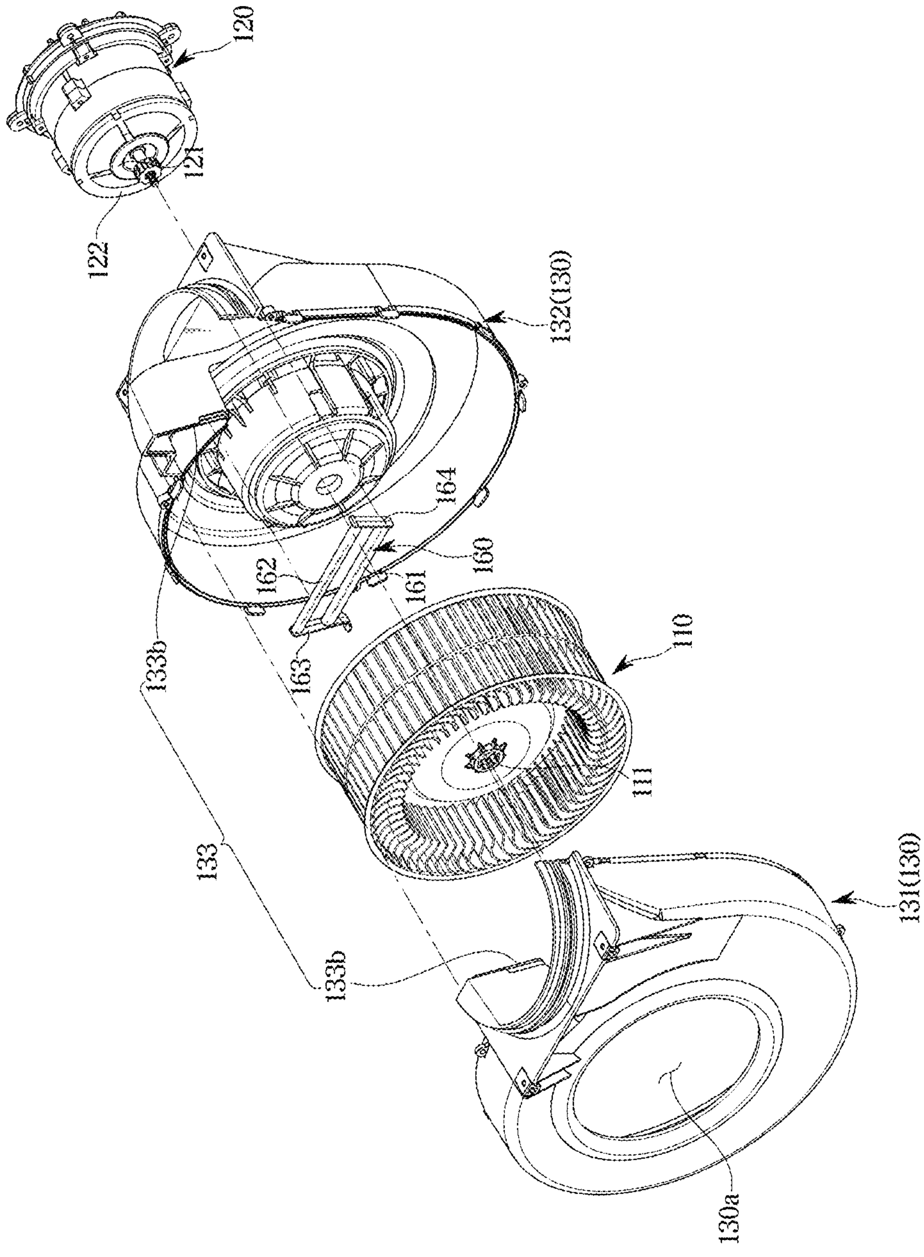
FIG. 12 is an exploded view illustrating the fan module illustrated in FIG. 11.

FIG. 11 is a view illustrating a fan module separated from a range hood according to various embodiments of the disclosure. FIG. 12 is an exploded view illustrating the fan module illustrated in FIG. 11.

A fan module 100*b* of a range hood according to various embodiments of the disclosure will be described with reference to FIGS. 11 and 12.

Referring to FIGS. 11 and 12, the fan module 100*b* of the range hood according to various embodiments of the disclosure may include a plurality of sound generating members 160.

According to various embodiments of the disclosure, the sound generating member 160 may include a first sound generating member 161 and a second sound generating member 162. The first sound generating member 161 and the second sound generating member 162 may be arranged to be vertically spaced apart by a predetermined distance. The first sound generating member 161 may be arranged in parallel to the second sound generating member 162. As described above, the first sound generating member 161 and the second sound generating member 162 may be arranged to cross the rotation axis of the fan 110.

A diameter of the first sound generating member 161 may be different from a diameter the second sound generating member 162. According to various embodiments of the disclosure, the diameter of the first sound generating member 161 may be greater than the diameter of the second sound generating member 162.

According to various embodiments of the disclosure, a first coupler 163 and a second coupler 164 may be provided at both ends of the sound generating member 160, and the first coupler 163 and the second coupler 164 may be respectively coupled to a first coupling groove 133 and a second coupling groove of the fan frame 130.

As illustrated in FIGS. 11 and 12, the sound generating member 160 may be provided as a pair. In certain embodiments, three or more sound generating members may be provided.

FIG. 13 is a graph illustrating a comparison of sound characteristics of a target sound of the range hood with a sound generating member, for each frequency band, and sound characteristics of the range hood for each frequency band.

Referring to FIG. 13, in response to the sound generating member 160 including the first sound generating member 161 and the second sound generating member 162, the sound level in the low frequency band of 1 kHz or less may be enhanced. Particularly, the sound level of the band of 200 Hz to 500 Hz may be enhanced. In response to providing the pair of sound generating members 160 spaced apart from each other, the sound characteristics of the range hood 20 may be similar to the target sound. That is, in order to further enhance the sound level of a desired frequency band, it is more appropriate to include a plurality of sound generating members rather than including one sound generating member.

Based on a relatively small separation distance between the first sound generating member 161 and the second sound generating member 162, a sound similar to that in which one sound generating member having a different cross-sectional shape is installed may be generated. Conversely, based on a relatively large separation distance between the first sound generating member 161 and the second sound generating member 162, sounds of different frequency bands may be generated by the two sound generating members. Based on the first sound generating member 161 and the second sound generating member 162 having an appropriate separation distance, the wake vortex may be generated according to the flow between the first sound generating member 161 and the second sound generating member 162, which may enhance the sound. The separation distance between the first sound generating member 161 and the second sound generating member 162 may be 5 times the diameter of the first sound generating member 161, but is not limited thereto. As the separation distance between the first sound generating member 161 and the second sound generating member 162, an appropriate value may be derived through experiments by varying the distance and diameter in the same manner as in the method for determining the diameter of the sound generating member.

Figure 14:
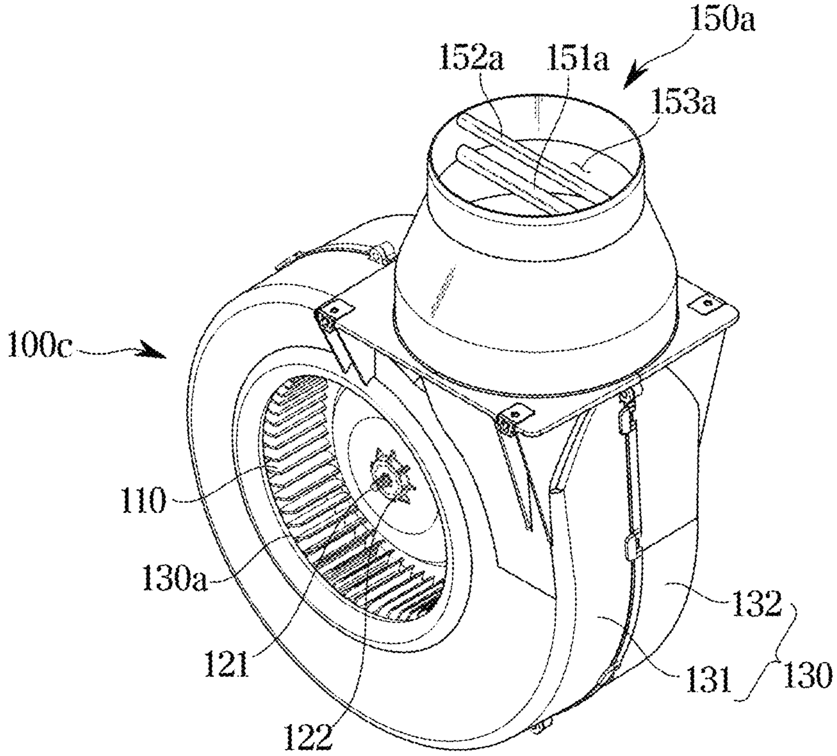
FIG. 14 is a view illustrating a fan module and a connecting member separated from a range hood according to various embodiments of the disclosure.
Figure 15:
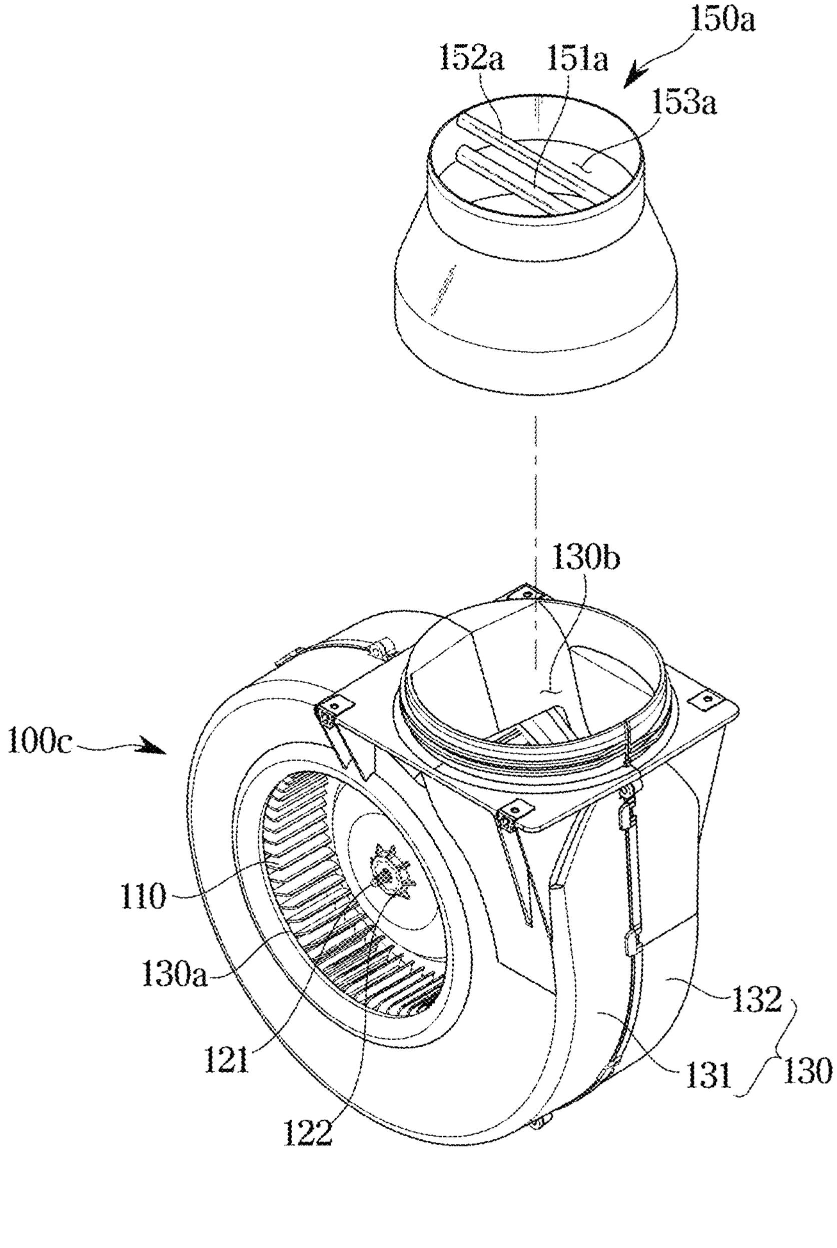
FIG. 15 is a view illustrating the fan module separated from the connecting member separated, illustrated in FIG. 14.

FIG. 14 is a view illustrating a fan module and a connecting member separated from a range hood according to various embodiments of the disclosure. FIG. 15 is a view illustrating the fan module separated from the connecting member separated, illustrated in FIG. 14.

A fan module 100*c* of a range hood according to various embodiments of the disclosure will be described with reference to FIGS. 14 and 15.

The fan module 100*c* of the range hood according to various embodiments of the disclosure may include a connecting member 150*a* connecting the fan outlet 130*b* to the exhaust pipe 3 (refer to FIG. 3). The connecting member 150*a* may be removably coupled to the protrusion of the fan frame 130 forming the fan outlet 130*b*. The connecting member 150 may connect the exhaust pipe 3 to the fan frame 130 in a state in which the exhaust pipe 3 is not allowed to be directly coupled to the fan frame 130 because an inner diameter of the exhaust pipe 3 is different from a diameter of the fan outlet 130*b*. Accordingly, the connecting member 150 may include a first opening corresponding to the diameter of the fan outlet 130*b* and a second opening 152 corresponding to the diameter of the exhaust pipe 3.

According to various embodiments of the disclosure, the sound generating members 151*a* and 152*a* may include a first sound generating member 151*a* and a second sound generating member 152*a*. The first sound generating member 151*a* and the second sound generating member 152*a* may be provided on the connecting member 150*a*. The first sound generating member 151*a* and the second sound generating member 152*a* may be provided integrally with the connecting member 150*a*, or the first sound generating member 151*a* and the second sound generating member 152*a* may be removably coupled to the connecting member 150*a* as illustrated in FIGS. 11 and 12.

As illustrated in FIGS. 14 and 15, the first sound generating member 151*a* and the second sound generating member 152*a* may be provided to cross the second opening 153*a* of the connecting member 150*a*. However, the disclosure is not limited thereto. The first sound generating member 151*a* and the second sound generating member 152*a* may be provided to cross the first opening of the connecting member 150*a* or may be provided between the first and second openings.

The range hood 20 including the fan module 100*c* according to various embodiments of the disclosure includes the first sound generating member 151*a* and the second sound generating member 152*a*, and thus it is possible to enhance the sound of the low frequency band of 1 kHz or less. Accordingly, the user's satisfaction with the performance of the range hood 20 may be improved.

As is apparent from the above description, a range hood may allow a user to feel enhanced performance by enhancing a sound of a predetermined band.

Further, a range hood may improve sound characteristics by improving a structure thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A range hood comprising:

a case comprising an inlet through which air is introduced; and a fan module arranged inside the case to suck air through the inlet, wherein the fan module comprises:

a fan configured to move air by rotating;

a motor configured to supply a driving force to rotate the fan;

a fan frame provided to accommodate the fan and the motor therein, the fan frame comprising a fan inlet and a fan outlet; and a sound generating member provided to generate a sound of a predetermined frequency band when in contact with the air discharged through the fan outlet, wherein the sound generating member is configured to create a vortex in the air discharged through the fan outlet.

2. The range hood of claim 1, wherein the predetermined frequency band is a frequency band of 1 kHz or less.

3. The range hood of claim 1, wherein the sound generating member is arranged in the fan frame such that the sound generating member spans the fan outlet.

4. The range hood of claim 3, wherein the sound generating member is removably coupled to the fan frame.

5. The range hood of claim 1, wherein the sound generating member comprises:

a first sound generating member; and a second sound generating member spaced apart from the first sound generating member and arranged in parallel with the first sound generating member.

6. The range hood of claim 5, wherein a diameter of the first sound generating member is different from a diameter of the second sound generating member.

7. The range hood of claim 5, wherein:

based on the first sound generating member and the second sound generating member respectively extending in a first direction, a rotation axis of the fan extends in a second direction intersecting the first direction, and the first sound generating member is spaced apart from the second sound generating member in a third direction intersecting the first direction and the second direction.

8. The range hood of claim 1, further comprising:

a connecting member comprising a first opening having a diameter corresponding to a diameter of the fan outlet; and a second opening connected to the first opening and having a diameter different from the first opening, wherein the connecting member is coupled to the fan frame to allow the first opening to be connected to the fan outlet.

9. The range hood of claim 8, wherein the sound generating member is provided to cross an inside of the connecting member so as to be in contact with the air that is discharged from the fan outlet through the second opening.

10. The range hood of claim 1, wherein the fan module is arranged inside the case in such a way that a rotation axis of the fan extends in a front and rear direction.

11. The range hood of claim 1, wherein the case comprises:
- a first case in which the inlet is provided on a lower surface thereof; and
- a second case provided above the first case and provided to accommodate the fan module.

12. The range hood of claim 11, wherein:
- the second case comprises an opening formed on an upper surface thereof, and
- at least a portion of the fan frame comprising the fan outlet is configured to insert into the opening.

13. The range hood of claim 1, wherein the sound generating member comprises a section in which a cross-sectional area changes along a direction in which the sound generating member extends.

14. The range hood of claim 1, wherein a cross section of the sound generating member is a circular shape, an airfoil shape, or a polygonal shape.

15. A range hood comprising:
- a case including:
  - an inlet formed on a lower surface of the case, and
  - an outlet formed above the inlet, and
- a fan module arranged inside the case to suck air through the inlet and provided to discharge the air through the outlet, the fan module including:
  - a fan configured to move air,
  - a motor configured to rotate the fan, and
  - a sound generating member arranged to cross the outlet and configured to generate a sound of 1 kHz or less when in contact with the air discharged through the outlet,
  - wherein the sound generating member is configured to create a vortex in the air discharged through the outlet.

16. The range hood of claim 15, wherein the sound generating member includes:
- a first sound generating member, and
- a second sound generating member spaced apart from the first sound generating member and arranged in parallel with the first sound generating member.

17. The range hood of claim 16, wherein a diameter of the first sound generating member is different from a diameter of the second sound generating member.

18. The range hood of claim 16, wherein:
- based on the first sound generating member and the second sound generating member respectively extending in a first direction, a rotation axis of the fan extends in a second direction intersecting the first direction, and
- the first sound generating member is spaced apart from the second sound generating member in a third direction intersecting the first direction and the second direction.

19. The range hood of claim 15, wherein the sound generating member includes a section in which a cross-sectional area changes along a direction in which the sound generating member extends.

20. The range hood of claim 15, wherein a cross section of the sound generating member is a circular shape, an airfoil shape, or a polygonal shape.

* * * * *